US012137803B2

(12) United States Patent
Wampler

(10) Patent No.: US 12,137,803 B2
(45) Date of Patent: Nov. 12, 2024

(54) FORCE TRANSFER APPARATUS FOR MASSAGE AND THERAPEUTIC BODYWORK TABLE

(71) Applicant: Daniel Wampler, Columbia, MO (US)

(72) Inventor: Daniel Wampler, Columbia, MO (US)

(73) Assignee: Daniel Wampler, Columbia, MO (US)

( * ) Notice: Subject to any disclaimer, the term of this patent is extended or adjusted under 35 U.S.C. 154(b) by 0 days.

(21) Appl. No.: 17/989,476

(22) Filed: Nov. 17, 2022

(65) Prior Publication Data

US 2024/0164515 A1 May 23, 2024

(51) Int. Cl.
*A47B 9/00* (2006.01)
*A61G 7/10* (2006.01)

(52) U.S. Cl.
CPC .............. *A47B 9/00* (2013.01); *A61G 7/1001* (2013.01); *A47B 2200/0056* (2013.01)

(58) Field of Classification Search
CPC ......... A47B 9/00; A47B 13/00; A47B 13/001; A47B 37/00; A47B 2200/0056; A47C 17/66; A61G 7/1057; A61G 7/001; A61G 7/1025; A61G 7/1026
See application file for complete search history.

(56) References Cited

U.S. PATENT DOCUMENTS 5,054,140 A * 10/1991 Bingham ............. A61G 7/0573 5/600
5,659,905 A * 8/1997 Palmer, Jr. ............. A61G 7/001 5/81.1 R
6,393,636 B1 * 5/2002 Wheeler .............. A61G 7/1032 5/81.1 R
6,591,435 B1 * 7/2003 Hodgetts .............. A61G 7/1019 5/81.1 HS
7,475,439 B1 1/2009 Cox et al.
7,895,688 B1 * 3/2011 Rowes ................... A61G 7/001 5/607
8,499,379 B2 * 8/2013 Ota ...................... A61G 7/1057 5/81.1 R
11,154,444 B1 * 10/2021 Yu .......................... A61G 7/001
2005/0155149 A1 * 7/2005 Pedersen .............. A61G 7/1044 5/81.1 R
2009/0307841 A1 * 12/2009 James .................. A61G 7/1061 5/88.1
2014/0317843 A1 * 10/2014 Martin ................ A61G 7/1055 5/88.1
2015/0216606 A1 * 8/2015 Bally ...................... A61G 7/012 248/220.22
2017/0231847 A1 * 8/2017 Hillenbrand, II .... A61G 7/1026 5/81.1 HS
2020/0315885 A1 * 10/2020 Connor .................. A61G 7/057
2022/0062079 A1 * 3/2022 Chen ....................... A61G 7/001
2023/0030514 A1 * 2/2023 Sillanpaa ............... A61G 13/06

* cited by examiner

*Primary Examiner* — Daniel J Rohrhoff
(74) *Attorney, Agent, or Firm* — Polsinelli PC

(57) ABSTRACT

A force transfer apparatus for massage and bodywork tables. In one preferred embodiment the force transfer apparatus includes a height adjustable table, a height adjustable conveyor lift, and an accessory roller. The accessory roller is used to transfer the angle of the sheet upon the height adjustable table to accommodate the rotation of the patient's body. With this novel invention, physical manipulation of the patient's body position in relation to the table is achieved with little to no effort by the patient or the massage therapist. This allows for the patient to remain relaxed during the transitional phase of the massage session.

18 Claims, 5 Drawing Sheets

FORCE TRANSFER APPARATUS FOR MASSAGE AND THERAPEUTIC BODYWORK TABLE

FIELD

The present disclosure relates generally to a force transfer apparatus for use within the massage service industry.

BACKGROUND

Massage is increasingly being offered along with standard treatment for a wide range of medical conditions and various chronic health situations. "A common misconception about massage is that it's only part of a spa day and intended for pampering yourself." See Mayo Clinic, "Benefits of Massage Therapy," (March 2022) https://www.mayoclinichealthsystem.org/hometown-health/speaking-of-health/benefits-of-massage-therapy. While earlier opinions on massage may vary, today it is a commonly used tool for stress reduction, pain relief, and medical treatment.

Massage therapy offers a safe and supportive environment for healing with results deep-rooted in science. A NIH-supported study analyzed how massage affects muscles at the molecular level and found massage therapy after exercise can assist with decreasing inflammation and increasing the rate at which muscles heal. "Other research suggests that massage therapy is effective in reducing and managing chronic low-back pain, which affects millions of Americans." See NIH News in Health (July 2012) http://newsinhealth.nih.gov/issue/July2012.

This invention aims to solve a long-standing problem within the massage service industry. Physical manipulation of the patient's body position in relation to the table during the transitional phase of the massage session creates difficulties for the therapist and patient. The present invention assists the patient through this process, therefore offering a better massage experience for the patient and maximizing the efforts of the therapist.

BRIEF DESCRIPTION OF THE DRAWINGS

The novel features of the disclosure are set forth with particularity in the appended claims. A better understanding of the features and advantages of the present inventive concept will be obtained by reference to the following detailed description that sets forth illustrative examples, in which the principles of the disclosure are utilized, and the accompanying drawings of which:

DETAILED DESCRIPTION

Figure 1:
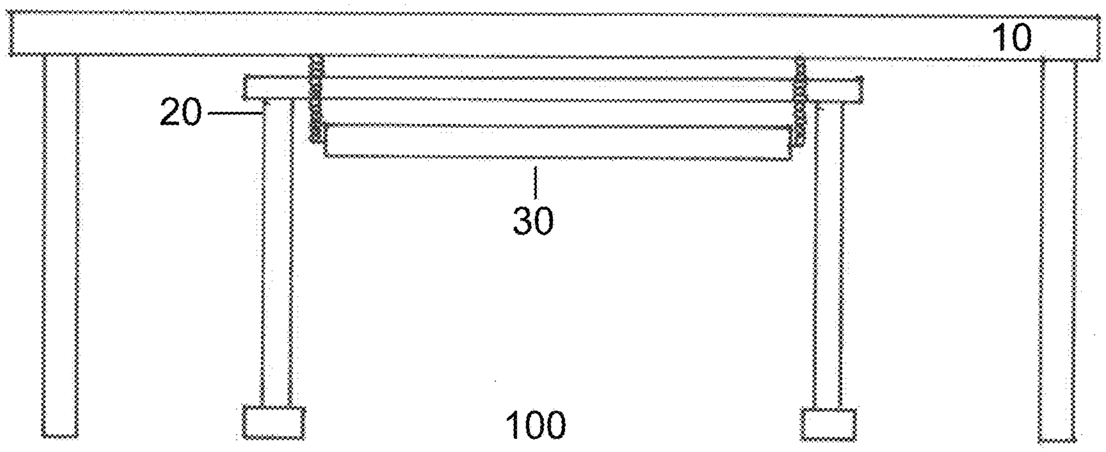
FIG. 1 illustrates a front view of the height adjustable table and height adjustable conveyor lift in a stored position, according to at least one instance of the present disclosure.

After reviewing this detailed description, it will become apparent to one skilled in the art how to implement the invention in various alternative embodiments and alternative applications. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but can include other elements not expressly listed or inherent to such process, process, article, or apparatus. Further, unless expressly stated to the contrary, "or" refers to an inclusive or and not to an exclusive or.

The term "coupled" is defined as connected, whether directly or indirectly through intervening components, and is not necessarily limited to physical connections. The connection can be such that the objects are permanently connected or releasably connected.

This invention provides a surprising and new solution to solve a well-known and recognized problem within the massage service industry. This invention aims to solve the long-standing problem within the massage industry of how to easily achieve rotation of the patient during the transitional phase of the massage. With this novel invention, physical manipulation of the patient's body position in relation to the table is achieved with little to no effort by the patient or the massage therapist. This allows for the patient to remain relaxed during the transitional phase of the massage session which provides several advantages over current methods and prior art. This invention offers a better massage experience for the patient therefore maximizing the efforts of the massage therapist.

The present disclosure presents a force transfer apparatus for massage and bodywork tables. In one preferred embodiment the device includes a height adjustable table, a height adjustable conveyor lift, and an accessory roller. This embodiment is accomplished by affixing the accessory roller, horizontally at table height, to the electric (or hydraulic) height adjustable table. A conveyor sheet which lies underneath the patient is secured to the height adjustable conveyor lift. Both the height adjustable table and height adjustable conveyor lift are raised to their active fully extended position. The height adjustable table is then progressively lowered while the height adjustable conveyor lift, with the attached sheet, remains in the active fully extended position. As the height adjustable table is lowered, the sheet is pulled out from under the patient, initiating the physical rotation of the patient's body in relation to the surface. The accessory roller is used to transfer the angle of the sheet to accommodate the rotation of the patient's body.

FIG. 1 illustrates a front view of a height adjustable table 10, height adjustable conveyor lift 20, and conveyor system 30 in a stored position 100, according to at least one instance of the present disclosure. The present disclosure presents a height adjustable table 10 and height adjustable conveyor lift 20 whose components can be combined in an assembled configuration. The height adjustable table 10 and height adjustable conveyor lift 20 can be fashioned out a variety of material such as wood, metal, plastic, composites, combinations of these materials, or any other type of material known in the art.

In order to explain the present disclosure in more detail, FIGS. 2-7 illustrate the function of the force transfer apparatus including the height adjustable table 10, height adjustable conveyor lift 20, and conveyor system 30 shown in various active and stored positions 100.

Figure 2:
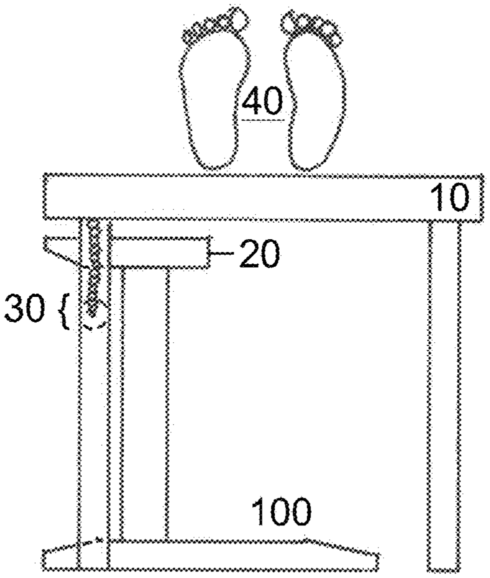
FIG. 2 illustrates an end view of the height adjustable table and height adjustable conveyor lift in a stored position, according to at least one instance of the present disclosure.

FIG. 2 illustrates an end view of the height adjustable table 10 and height adjustable conveyor lift 20 in a stored position 100, according to at least one instance of the present disclosure. The height adjustable conveyor lift 20 remains in a stored position 100 underneath the massage table when not in use. During the transitional phase of the massage session, the height adjustable conveyor lift 20 is pulled out from under the massage table.

Figure 3A:
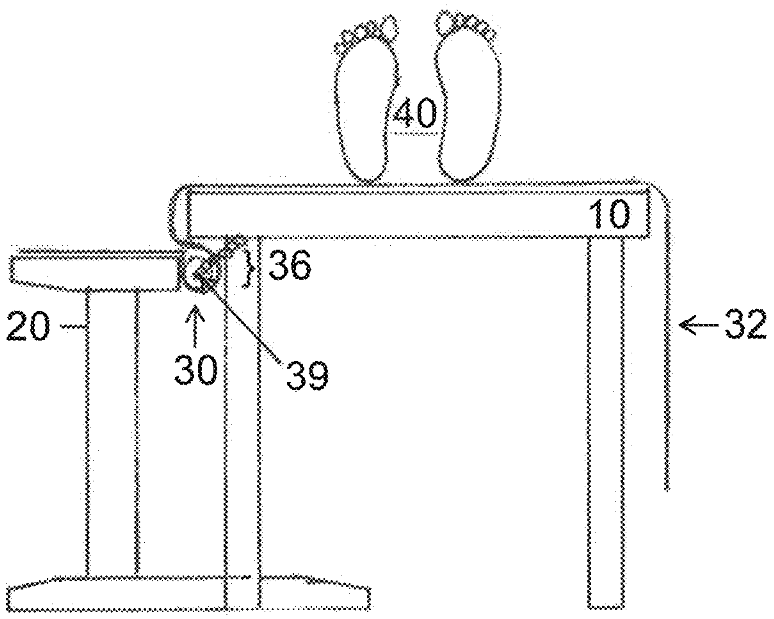
FIG. 3A illustrates an end view of the height adjustable table, height adjustable conveyor lift, and conveyor system in an active start position, according to at least one instance of the present disclosure

FIG. 3A illustrates an end view of the height adjustable table 10, height adjustable conveyor lift 20, and conveyor system 30 in an active start position, according to at least one instance of the present disclosure.

As illustrated in FIG. 3A, the conveyor system 30 consists of a force transfer medium, depicted here as a conveyor sheet 32. The conveyor system 30 also contains an accessory roller 36. Operation of the conveyor system 30 may be achieved with manipulation of the force transfer medium or conveyor sheet 32. In this embodiment, the conveyor sheet 32 is affixed to one end of the height adjustable conveyor lift 20. The accessory roller 36 is affixed to the height adjustable table 10. In use, the conveyor sheet 32 is pulled from the underneath the patient 40 as the conveyor sheet 32 travels proximal to the surface of the height adjustable table 10. The accessory roller 36 can be affixed to the height adjustable table 10 in a plurality of bonding mechanisms including adhesion, pressure fit, or other mechanical attachment through screws, cable ties, or wires. In a preferred embodiment the accessory roller 36 can be affixed to the height adjustable table 10 in a method allowing gravity to release it below table height when not in use.

The conveyor sheet 32 can be a reinforced massage sheet made of various materials including cotton, microfiber, linen, polyester, or any other blend of woven fabric. Alternatively, the conveyor sheet 32 may be made of reinforced material such that it lays under a traditional massage sheet and on top of the fitted massage table sheet. The conveyor sheet 32 can be reinforced with a reinforcement element at the attachment site of the height adjustable conveyor lift 20 to withstand the force necessary to physically manipulate the position of the patient 40 in relation to the table. The reinforcement element can provide the desired tensile and compressive strength needed to transfer the angle of the conveyor sheet 32.

The conveyor sheet 32 may be directed into the conveyor system 30 by one or more rollers positioned on an axle 39. The accessory roller 36 may be various forms of rollers including pulleys, drums, and other materials known in the art. In one embodiment, the conveyor system 30 contains multiple accessory rollers 36. In this embodiment, one large roller occupies the middle section (torso) of the patient and two smaller rollers accommodate the head and feet. The use of multiple rollers would accommodate the physical rotation of the patient and assist in stabilization during the rotation. This embodiment will help to accommodate heavier patients due to the ability to generate an increased force necessary to achieve rotation. Multiple rollers will also assist with rotation of patients with limiting pre-existing health conditions making it difficult for them to rotate freely. Another embodiment of the current invention can contain at least two height adjustable conveyor lifts 20 in order to accommodate the multiple rollers described above. Providing additional height adjustable conveyor lifts 20 to be coupled with the extra accessory rollers 36 would assist in rotation of the patient.

Figure 3B:
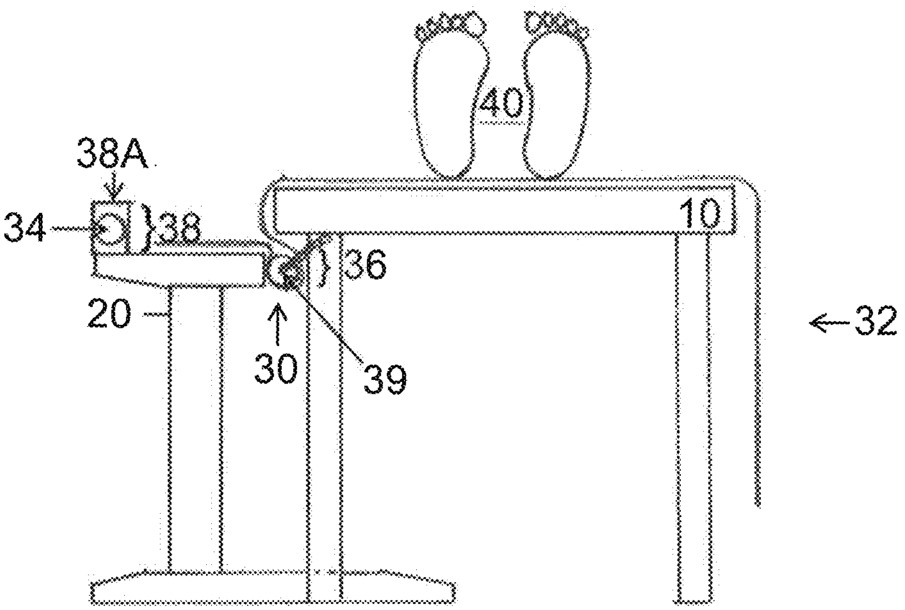
FIG. 3B illustrates an end view of the height adjustable table, height adjustable conveyor lift, and conveyor system in an active start position, according to at least one instance of the present disclosure.

FIG. 3B illustrates an end view of the height adjustable table 10, height adjustable conveyor lift 20, and conveyor system 30 in an active start position, according to at least one instance of the present disclosure.

In another embodiment demonstrated by FIG. 3B, the conveyor system 30 consists of a conveyor sheet 32, accessory roller 36, and motor unit 38.

The conveyor sheet 32 is contained within the motor unit exterior casing 38A. Upon exiting the motor unit exterior casing 38A, the conveyor sheet 32 travels proximal to the surface of the height adjustable conveyor lift 20 and is then directed toward the accessory roller 36 where the conveyor sheet 32 enters the posterior side of the accessory roller 36. The conveyor sheet 32 travels under the posterior side of the accessory roller 36 then exits at the opposite end of the of the accessory roller 36.

In another embodiment, the conveyor system 30 consists of a conveyor sheet 32, main roller 34, accessory roller 36, and motor unit 38.

The conveyor sheet 32 is contained within the motor unit exterior casing 38A. Upon exiting the motor unit exterior casing 38A, the conveyor sheet 32 enters at one end of the main roller 32, as shown in this embodiment entering the anterior side of the main roller 34. The conveyor sheet 32 is directed into the conveyor system 30 by one or more rollers positioned on an axle 39. The conveyor sheet 32 travels over the anterior side of the main roller 34 then exits at the opposite end of the of the main roller 34.

The conveyor sheet 32 is then directed toward the accessory roller 36 where the conveyor sheet 32 enters the posterior side of the accessory roller 36. The conveyor sheet 32 travels under the posterior side of the accessory roller 36 then exits at the opposite end of the of the accessory roller 36.

The conveyor sheet 32 may be a continuous belt, in which case conveyor sheet 30 is fed back to main roller 34 at the opposite end of the roller after traveling through the motor unit exterior casing 38A. In this embodiment, the conveyor system 30 may travel in either direction, either towards the main roller 34 or, alternatively, away from the main roller 34. The size and weight of the conveyor sheet 30 can be configured to assist in controlling the tension in conveyor system 30 when in operation. In other embodiments the conveyor sheet 32 may be replaced with a conveyor belt which is placed under a massage sheet.

As described above, various embodiments illustrate the conveyor system 30 containing a motor unit 38 configured to pull the conveyor sheet 32 out from under the massage patient 40. In operation, the motor unit 38 retracts the conveyor sheet 32 pulling the conveyor sheet 32 into the motor unit exterior casing 38A. Once the conveyor sheet 32 is retracted into the motor unit exterior casing 38A it can be stored in a rolled position. In an alternative embodiment, the conveyor sheet 32 may be a continuous belt which runs through the motor unit exterior casing 38A.

The motor unit 38 may be independently driven in order to maintain constant tension. In some embodiments, a weighted accessory roller 36 may be used to assist in maintaining the tension along the conveyor sheet 32 and to remove slack from the conveyor system 30. Proper tension assists the conveyor system to properly up-take or retract the conveyor sheet 32 into the motor unit exterior casing 38A. Proper tension can also prevent strain on the motor unit 38 caused by slack created while feeding the conveyor sheet 32 into the motor unit exterior casing 38A.

Figure 4:
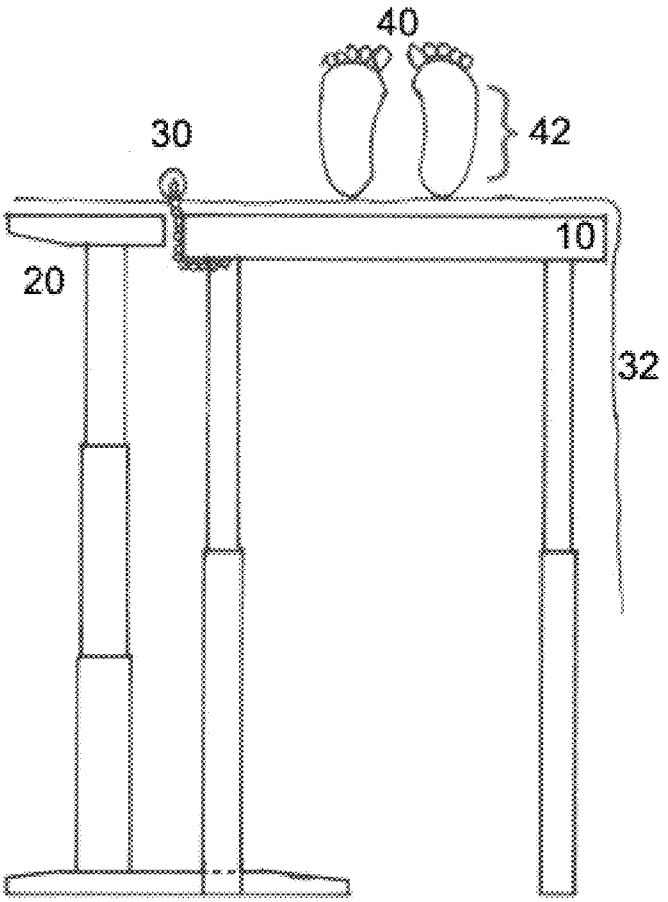
FIG. 4 illustrates an end view of the height adjustable table and height adjustable conveyor lift in an active fully extended position, according to at least one instance of the present disclosure.

FIG. 4 illustrates an end view of the height adjustable table 10 and height adjustable conveyor lift 20 in an active fully extended position, according to at least one instance of the present disclosure.

In this embodiment, both the height adjustable table 10 and height adjustable conveyor lift 20 are raised to an active fully extended position. The patient 40 begins in a supine position 42 on the height adjustable table 10. Alternatively, the patient 40 could also begin in a prone position 46. In one embodiment, both the height adjustable table 10 and height adjustable conveyor lift 20 are raised simultaneously to a maximum height. In another embodiment the height adjustable table 10 and height adjustable conveyor lift 20 maintain varied positions until the desired height is obtained.

Figure 5:
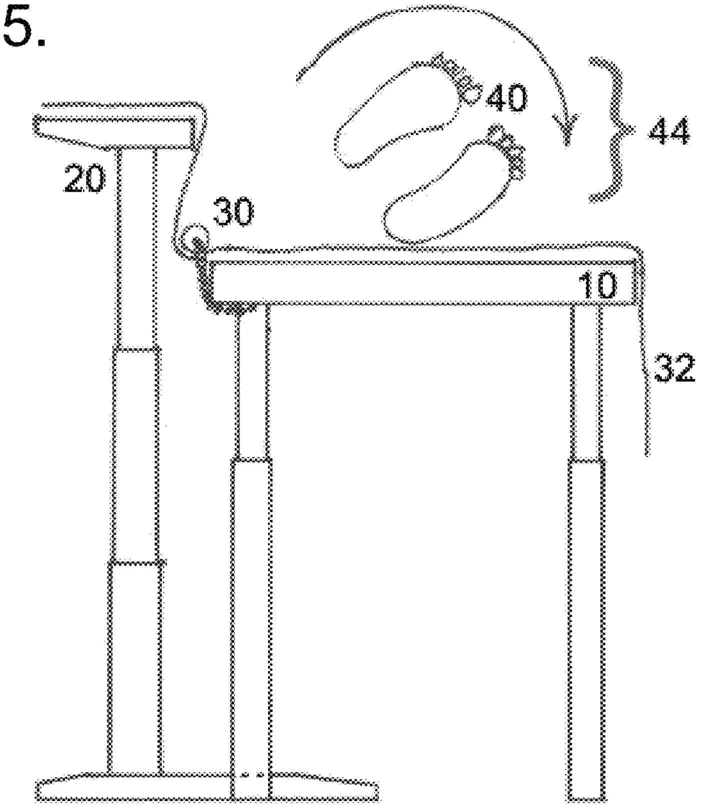
FIG. 5 illustrates an end view of the height adjustable table in an active fully extended position and height adjustable conveyor lift in an active partially lowered position, according to at least one instance of the present disclosure.

FIG. 5 illustrates an end view of the height adjustable table 10 in an active fully extended position and height adjustable conveyor lift 20 in an active partially lowered position, according to at least one instance of the present disclosure. Once the height adjustable table 10 and height adjustable conveyor lift 20 are raised to maximum height, the height adjustable table 10 is then progressively lowered while the height adjustable conveyor lift 20, with the attached conveyor sheet 32, remains in the active fully extended position. The conveyor sheet 32, which lies underneath the patient 40 and is secured to the height adjustable conveyor lift 20, is progressively pulled out from underneath the patient 40 initiating the physical rotation of the patient's body in relation to the surface.

Figure 6:
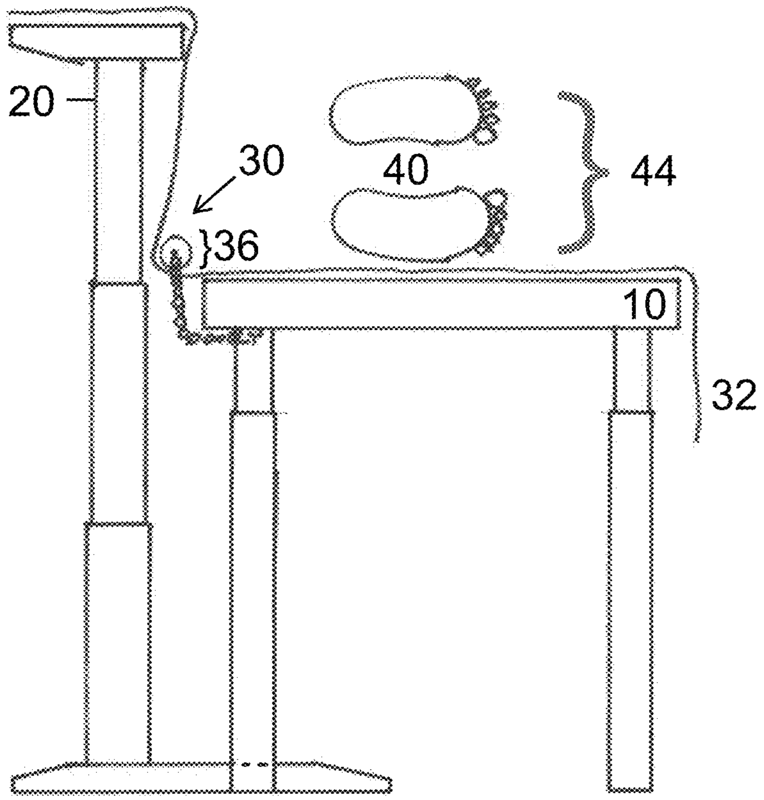
FIG. 6 illustrates an end view of the height adjustable table in an active fully extended position and height adjustable conveyor lift in an active partially lowered position, according to at least one instance of the present disclosure.

FIG. 6 illustrates an end view of the height adjustable conveyor lift 20 in an active fully extended position and height adjustable table 10 in an active partially lowered position, according to at least one instance of the present disclosure. The accessory roller 36 is utilized to transfer the angle of the conveyor sheet 32 which is directly underneath the patient 40. As illustrated by FIG. 6, the patient 40 maintains a centered position on the height adjustable table 10 while rotating into a lateral recumbent position 44. This transfer of force achieved due to the unique angle of the conveyor sheet 32 is vital to ensure the patient 40 remains centered on the height adjustable table 10. Without the transfer of force achieved due to the unique angle of the conveyor sheet 32, the patient 40 is unlikely to initiate the proper physical rotation in relation to the surface off the table.

Figure 7:
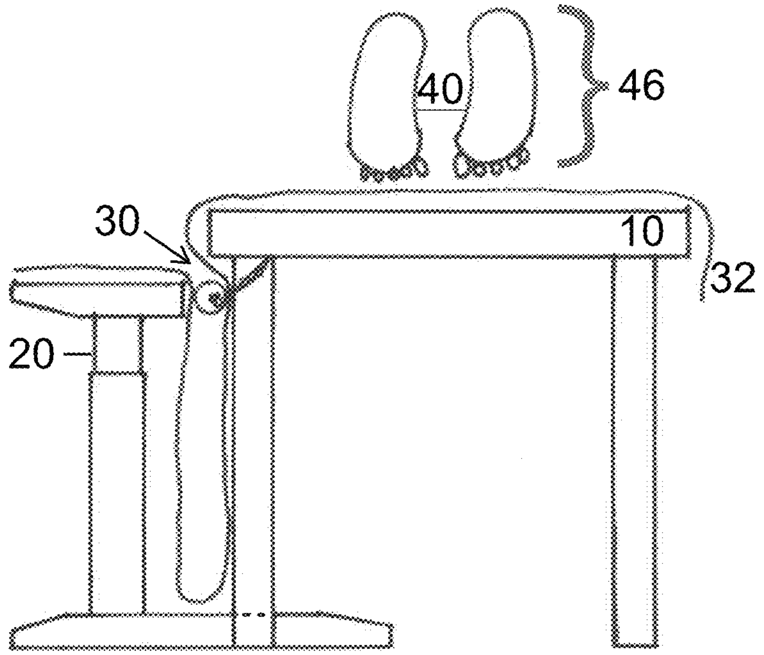
FIG. 7 illustrates an end view of the height adjustable table in an active fully lowered position and height adjustable conveyor lift in an active fully lowered position, according to at least one instance of the present disclosure.

FIG. 7 illustrates an end view of the height adjustable table in an active fully lowered position and height adjustable conveyor lift in an active fully lowered position, according to at least one instance of the present disclosure. The patient 40 concludes rotation once the patient's body position in relation to the table is opposite the starting position. As illustrated in FIG. 7, the patient 40 began in a supine position 42 and is depicted as completing the rotation in a prone position 46. Alternatively, in another embodiment the patient 40 could began in a prone position 46 and complete rotation in a supine position 42. With this novel concept, physical manipulation of the patient's 40 body position in relation to the height adjustable table 10 is achieved.

Figure 8:
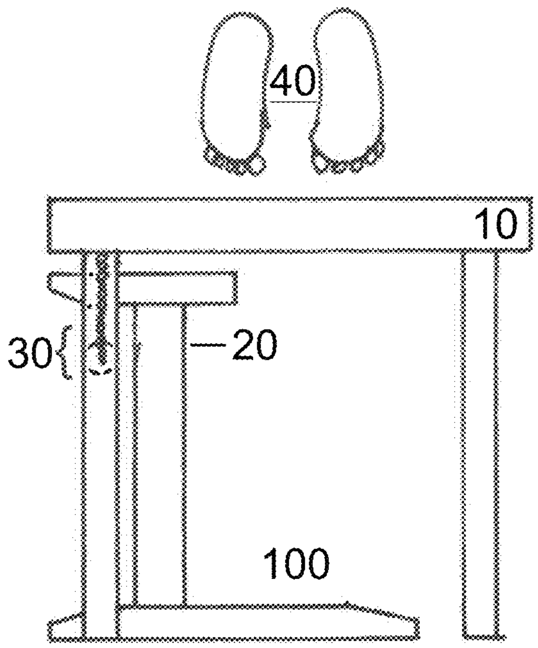
FIG. 8 illustrates an end view of the height adjustable table and height adjustable conveyor lift in a stored position, according to at least one instance of the present disclosure.

FIG. 8 illustrates an end view of the height adjustable table 10 and height adjustable conveyor lift 20 in a stored position 100, according to at least one instance of the present disclosure. This figure demonstrates the height adjustable table 10 and height adjustable conveyor lift 20 returned to the original stored position 100, While preferred examples of the present inventive concept have been shown and described herein, it will be obvious to those skilled in the art that such examples are provided by way of example only. Numerous variations, changes, and substitutions will now occur to those skilled in the art without departing from the disclosure. It should be understood that various alternatives to the examples of the disclosure described herein can be employed in practicing the disclosure. It is intended that the following claims define the scope of the disclosure and that methods and structures within the scope of these claims and their equivalents be covered thereby.

Illustrative Examples of the Disclosure Include

Aspect 1: A force transfer apparatus comprising a height adjustable table; a height adjustable conveyor lift adapted to receive and accommodate a force transfer medium; and an accessory roller, wherein the accessory roller is adapted to receive and accommodate a force transfer medium.

Aspect 2: The force transfer apparatus of claim 1, wherein the height adjustable table is operable to be coupled with the height adjustable conveyor lift and accessory roller in an assembled position and separate from the height adjustable conveyor lift and accessory roller in an unassembled position.

Aspect 3: The force transfer apparatus of claim 1, where in the height adjustable table has an adjustable support structure to transition from an active lowered position to an active extended position.

Aspect 4: The force transfer apparatus of claim 1, wherein the height adjustable table has a support surface adapted to accommodate a patient.

Aspect 5: The force transfer apparatus of claim 1, wherein the height adjustable table is a bodywork table designed for massage therapy.

Aspect 6: The force transfer apparatus in claim 1, wherein the height adjustable conveyor lift is operable to transition from an active lowered position to an active extended position.

Aspect 7: The force transfer apparatus in claim 1, wherein the height adjustable conveyor lift contains an electric motor to transition from an active lowered position to an active extended position.

Aspect 8: The force transfer apparatus in claim 1, wherein the height adjustable conveyor lift contains an attachment site to affix the force transfer medium to the height adjustable conveyor lift.

Aspect 9: The force transfer apparatus in claim 8, wherein the height adjustable conveyor lift attachment site can withstand the force to physically manipulate the position of a patient in relation to the table.

Aspect 10: The force transfer apparatus in claim 1, wherein the force transfer medium is a conveyor sheet.

Aspect 11: The force transfer apparatus in claim 10, wherein the accessory roller maintains tension across the conveyor sheet.

Aspect 12: The force transfer apparatus in claim 1, wherein the accessory roller is affixed horizontally to the height adjustable table.

Aspect 13: A force transfer apparatus comprising: a height adjustable table; a height adjustable conveyor lift; a conveyor system comprising: a motor unit adapted to receive and accommodate a force transfer medium; and an accessory roller, wherein the accessory roller is adapted to receive and accommodate a force transfer medium.

Aspect 14: The force transfer apparatus in claim 13, where in the height adjustable table has an adjustable support structure to transition from an active lowered position to an active extended position.

Aspect 15: The force transfer apparatus of claim 13, wherein the height adjustable table has a support surface adapted to accommodate a patient.

Aspect 16: The force transfer apparatus in claim 13, wherein the height adjustable conveyor lift contains an electric motor to transition from an active lowered position to an active extended position.

Aspect 17: The force transfer apparatus in claim 13, wherein the height adjustable conveyor lift contains an attachment site to affix the force transfer medium to the height adjustable conveyor lift.

Aspect 18: The force transfer apparatus in claim 13, wherein the force transfer medium is a conveyor sheet.

Aspect 19: The force transfer apparatus in claim 13, wherein the accessory roller maintains tension across the conveyor sheet and is affixed horizontally to the height adjustable table.

Aspect 20: A method of rotating the position of a massage therapy patient's body, said method comprising lifting a height adjustable table with a massage therapy patient to an active extended position; lifting a height adjustable conveyor lift to an active extended position; progressively lowering the height adjustable table while the height adjustable conveyor lift remains in the active extended position; initiating the movement of a conveyor sheet located underneath a massage therapy patient's body and affixed to the height adjustable conveyor lift: and achieving the physical rotation of the patient's body in relation to a surface.

The invention claimed is:

1. A force transfer apparatus comprising:

a height adjustable bodywork table for massage therapy on a patient;

a height adjustable conveyor lift separate from the height adjustable table in an unassembled position, wherein the height adjustable conveyor lift is adapted to receive and accommodate a force transfer medium; and an accessory roller, wherein the accessory roller is adapted to receive and accommodate a force transfer medium for the patient; wherein the patient resting on the force transfer medium is rotated when the height adjustable table is lowered while the height adjustable conveyor lift remains in a fully extended position.

2. The force transfer apparatus of claim 1, wherein the height adjustable table is operable to be coupled with the height adjustable conveyor lift and accessory roller in an assembled position and separate from the height adjustable conveyor lift and accessory roller in an unassembled position.

3. The force transfer apparatus of claim 1, where in the height adjustable table has an adjustable support structure to transition from an active lowered position to an active extended position.

4. The force transfer apparatus of claim 1, wherein the height adjustable table has a support surface adapted to accommodate the patient.

5. The force transfer apparatus in claim 1, wherein the height adjustable conveyor lift is operable to transition from an active lowered position to an active extended position.

6. The force transfer apparatus in claim 1, wherein the height adjustable conveyor lift contains an electric motor to transition from an active lowered position to an active extended position.

7. The force transfer apparatus in claim 1, wherein the height adjustable conveyor lift contains an attachment site to affix the force transfer medium to the height adjustable conveyor lift.

8. The force transfer apparatus in claim 7, wherein the height adjustable conveyor lift attachment site can withstand the force to physically manipulate the position of a patient in relation to the table.

9. The force transfer apparatus in claim 1, wherein the force transfer medium is a conveyor sheet.

10. The force transfer apparatus in claim 9, wherein the accessory roller maintains tension across the conveyor sheet.

11. The force transfer apparatus in claim 1, wherein the accessory roller is affixed horizontally to the height adjustable table.

12. A force transfer apparatus comprising:

a height adjustable bodywork table for massage therapy on a patient;

a height adjustable conveyor lift separate from the height adjustable table in an unassembled position;

a conveyor system comprising:

a motor unit adapted to receive and accommodate a force transfer medium for the patient; and an accessory roller, wherein the accessory roller is adapted to receive and accommodate the force transfer wherein the patient resting on the force transfer medium is rotated when the height adjustable table is lowered while the height adjustable conveyor lift remains in a fully extended position.

13. The force transfer apparatus in claim 12, wherein the height adjustable table has an adjustable support structure to transition from an active lowered position to an active extended position.

14. The force transfer apparatus of claim 12, wherein the height adjustable table has a support surface adapted to accommodate a patient.

15. The force transfer apparatus in claim 12, wherein the height adjustable conveyor lift contains an electric motor to transition from an active lowered position to an active extended position.

16. The force transfer apparatus in claim 12, wherein the height adjustable conveyor lift contains an attachment site to affix the force transfer medium to the height adjustable conveyor lift.

17. The force transfer apparatus in claim 12, wherein the force transfer medium is a conveyor sheet.

18. The force transfer apparatus in claim 12, wherein the accessory roller maintains tension across the conveyor sheet and is affixed horizontally to the height adjustable table.

* * * * *